United States Patent
Angell et al.

[11] Patent Number: 5,821,867
[45] Date of Patent: Oct. 13, 1998

[54] TRANSREFLECTIVE INSTRUMENT DISPLAY

[75] Inventors: Daniel K. Angell, Allen Park; Kathleen M. Schulz, Novi; Scott D. Saari, Farmington, all of Mich.

[73] Assignee: Ford Motor Company, Dearborn, Mich.

[21] Appl. No.: 569,383

[22] Filed: Dec. 8, 1995

[51] Int. Cl.[6] .............................. G08B 5/22; B60Q 1/00
[52] U.S. Cl. .............................. 340/815.45; 340/815.78; 340/461; 340/525; 345/7; 116/288; 116/309; 116/62.1; 362/23; 362/26; 362/29
[58] Field of Search .................. 340/815.45, 815.47, 340/815.78, 815.79, 525, 461, 980, 462; 345/7, 8; 116/286–288, 309, 310, 62.1; 362/23, 26, 29, 30, 31

[56] References Cited

U.S. PATENT DOCUMENTS

| | | | |
|---|---|---|---|
| 2,165,498 | 7/1939 | Moody | 116/62.1 |
| 2,309,941 | 2/1943 | Drummond | 116/299 |
| 2,685,818 | 8/1954 | Mihalakis | 353/14 |
| 2,693,131 | 11/1954 | Mihalakis | 353/14 |
| 2,737,845 | 3/1956 | Mihalakis | 353/14 |
| 2,935,729 | 5/1960 | Henss | 340/461 |
| 3,622,773 | 11/1971 | Schuster | 362/23 |
| 3,622,774 | 11/1971 | Schuster | 362/23 |
| 4,077,138 | 3/1978 | Foerst | 434/69 |
| 4,163,428 | 8/1979 | Ishikawa | 116/288 |
| 4,182,053 | 1/1980 | Allen et al. | 434/69 |
| 4,443,835 | 4/1984 | Brautigam et al. | 362/300 |
| 4,551,790 | 11/1985 | Benguey et al. | 362/23 |
| 4,656,561 | 4/1987 | Shinbo et al. | 362/30 |
| 4,716,458 | 12/1987 | Heitzman et al. | 348/115 |
| 4,774,672 | 9/1988 | Tsunoda et al. | 701/208 |
| 4,808,978 | 2/1989 | Vernay | 345/8 |
| 4,878,453 | 11/1989 | Inoue et al. | 116/288 |
| 4,886,328 | 12/1989 | Iino | 340/980 |
| 4,970,400 | 11/1990 | Muramatsu | 116/286 |
| 4,991,537 | 2/1991 | Muramatsu | 116/286 |
| 5,051,735 | 9/1991 | Furukawa | 345/7 |
| 5,099,229 | 3/1992 | Aoki | 345/7 |
| 5,142,274 | 8/1992 | Murphy et al. | 362/27 |
| 5,440,428 | 8/1995 | Hegg et al. | 345/7 |

FOREIGN PATENT DOCUMENTS

| | | |
|---|---|---|
| 3-77016(A) | 4/1991 | Japan. |
| 306183 | 11/1927 | WIPO. |

Primary Examiner—Donnie L. Crosland
Attorney, Agent, or Firm—Steven A. Maynard

[57] ABSTRACT

A transreflective instrument display has a generally planar reverse image light emitting display panel, a transflector surface positioned at a predetermined angle with respect to the display panel. The transflector has a P-plane reflectance and S-plane reflectance. A illuminated pointer is positioned behind the transflector. The display is formed of light transmitted from the pointer and reflecting light from said display panel simultaneously to form an image. The transflector is preferably coated with a coating that increases the reflectivity of the P-plane polarization of the transflector.

1 Claim, 5 Drawing Sheets

TRANSREFLECTIVE INSTRUMENT DISPLAY

FIELD OF THE INVENTION

The present invention relates generally to an instrument display for an automotive vehicle, and more specifically to a reflecting display having controlled brightness.

BACKGROUND OF THE INVENTION

Reflecting a reverse image to a obtain a properly oriented image has several applications. One obstacle for using such an idea in motor vehicle applications is the principal of polarization and the fact that vehicle drivers often wear sunglasses using polarizing lenses to prevent glare.

The phenomena of polarization occurs when unpolarized light is reflected from a surface. The reflected light becomes at least partially polarized. The degree of polarization depends on the angle of incidence and the indices of refraction of the two media.

Sunglasses often use polarizing lenses to reduce the effect of the glare of polarized light reflected from a horizontal plane such as a lake or snow. If a reflecting display where implemented in an automotive vehicle, the brightness of the display as viewed through polarizing lenses would be significantly reduced.

One way to reduce the problem is to increase the total brightness of the display. Brightness may be increased by increasing the power consumption of the display. Because of increased electronic content of motor vehicles, each component must use as little power as possible, thus making increasing power undesirable. An increase in power consumption may also require an stronger, more expensive components and materials due to increased thermal loads, further making increased power undesirable.

It would be desirable to used reflected light as an instrument display for an automotive vehicle without penalizing drivers wearing polarizing lens.

SUMMARY OF THE INVENTION

The present invention overcomes the disadvantages of the related art by providing an instrument cluster having increased brightness when viewed through polarized lenses.

The instrument panel has a generally planar reverse image light emitting display panel, a transflector surface positioned at a predetermined angle with respect to the display panel. The transflector has a P-plane reflectance and S-plane reflectance. An illuminated pointer is positioned behind the transflector. The display is formed of light transmitted from the pointer and reflecting light from said display panel simultaneously to form an image. The transflector is preferably coated with a coating that increases the reflectivity of the P-plane polarization.

One advantage of the present invention is that that while the P-Plane reflectance is increased the S-plane reflectance plane reflectance has also been increased without increasing power consumption. Increasing S-plane polarization improves the brightness of the display viewed without polarizing lenses.

BRIEF DESCRIPTION OF THE DRAWINGS

These and other objects and advantages of the present invention will be apparent to those skilled in the arts upon reading the following description with reference to the accompanying drawings, in which.

DETAILED DESCRIPTION OF THE PREFERRED EMBODIMENT

Figure 1:
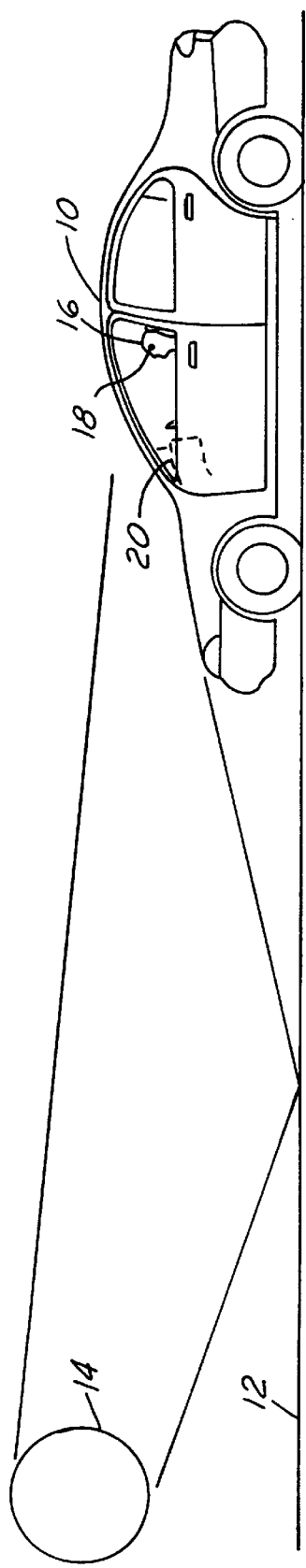
FIG. 1 is a perspective of an automobile having an improved instrument display according to the present invention.

Referring to FIG. 1, an automotive vehicle 10 having an instrument display 20 is shown with respect to a horizontal plane 12. The sun 14 directly shines into vehicle 10 and reflects light rays from horizontal plane 12. A vehicle operator 16 typically wears sunglasses 18 to decrease the effects of the direct and reflected light. The light reflected from the road surface is primarily S-plane polarized. Sunglasses 18 have polarizing lenses that essentially eliminate the transmission of S-plane polarized light to the vehicle operator 16.

Figure 2A:
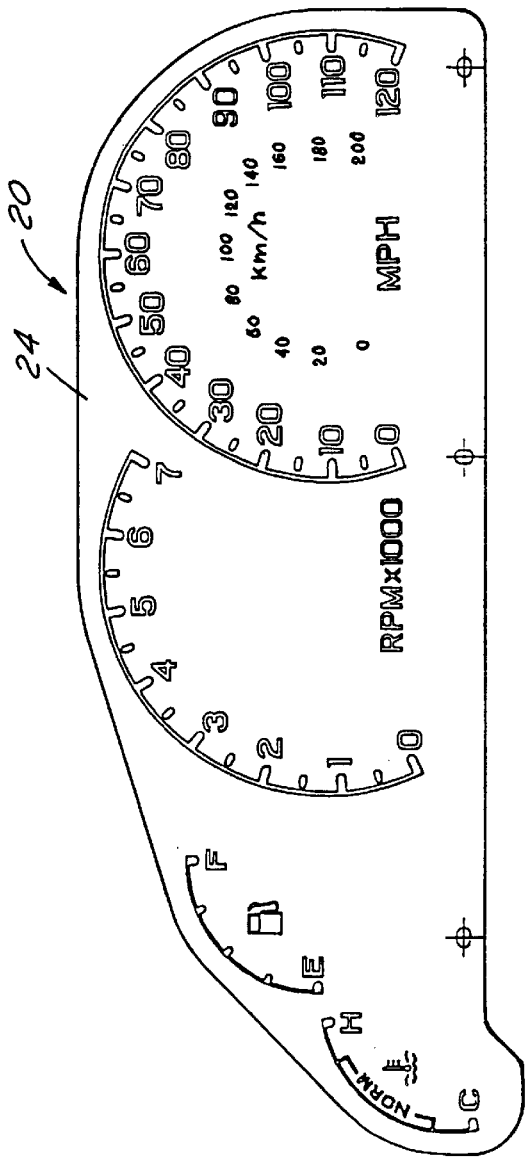
FIG. 2a is a front view of an instrument display according to the present invention.

Referring now to FIG. 2a, an instrument display 20 is used to display information about the vehicle operation to vehicle operator 16. As shown instrument display indicates vehicle speed, engine speed, fuel level and engine temperature, although several other functions would be evident to those skilled in the art. A transflector 24 reflects the information shown to the vehicle operator.

Figure 2B:
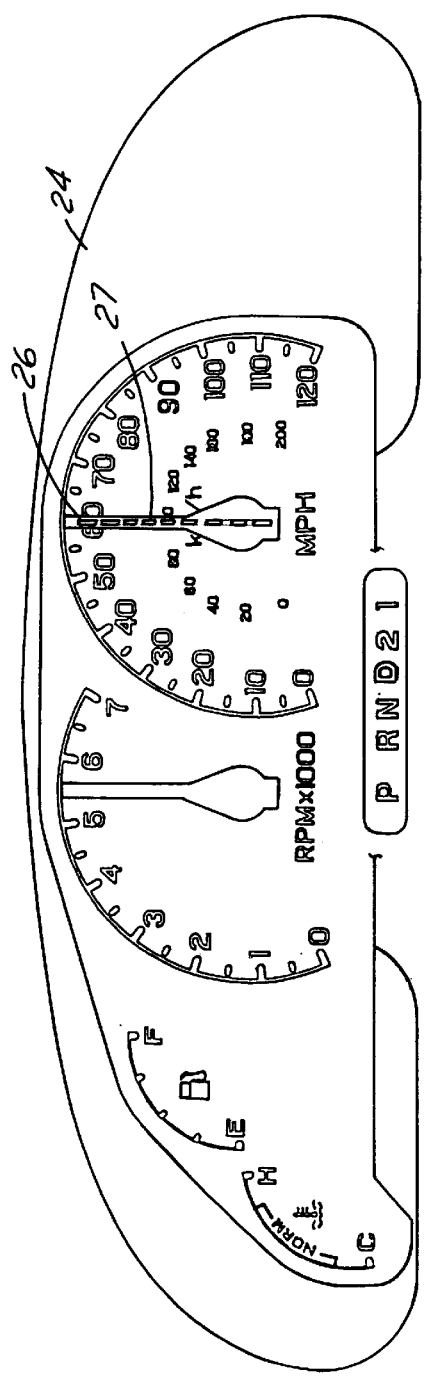
FIG. 2b is a front view of an instrument display with a pointer according to the present invention.

Referring now to FIG. 2b, a light emitting pointer 26 mounted behind transflector 24 is used as an indicator of the magnitude of the function displayed. Pointer 26 is preferably comprised of a number of light emitting diodes 27. The light emitted from pointer 26 is transmitted through transflector 24 and combines with the light reflected from transflector 24 to form the complete display. The display can also be combined with other conventional display devices such as a trip computer or driver function indicators (not shown).

Figure 3:
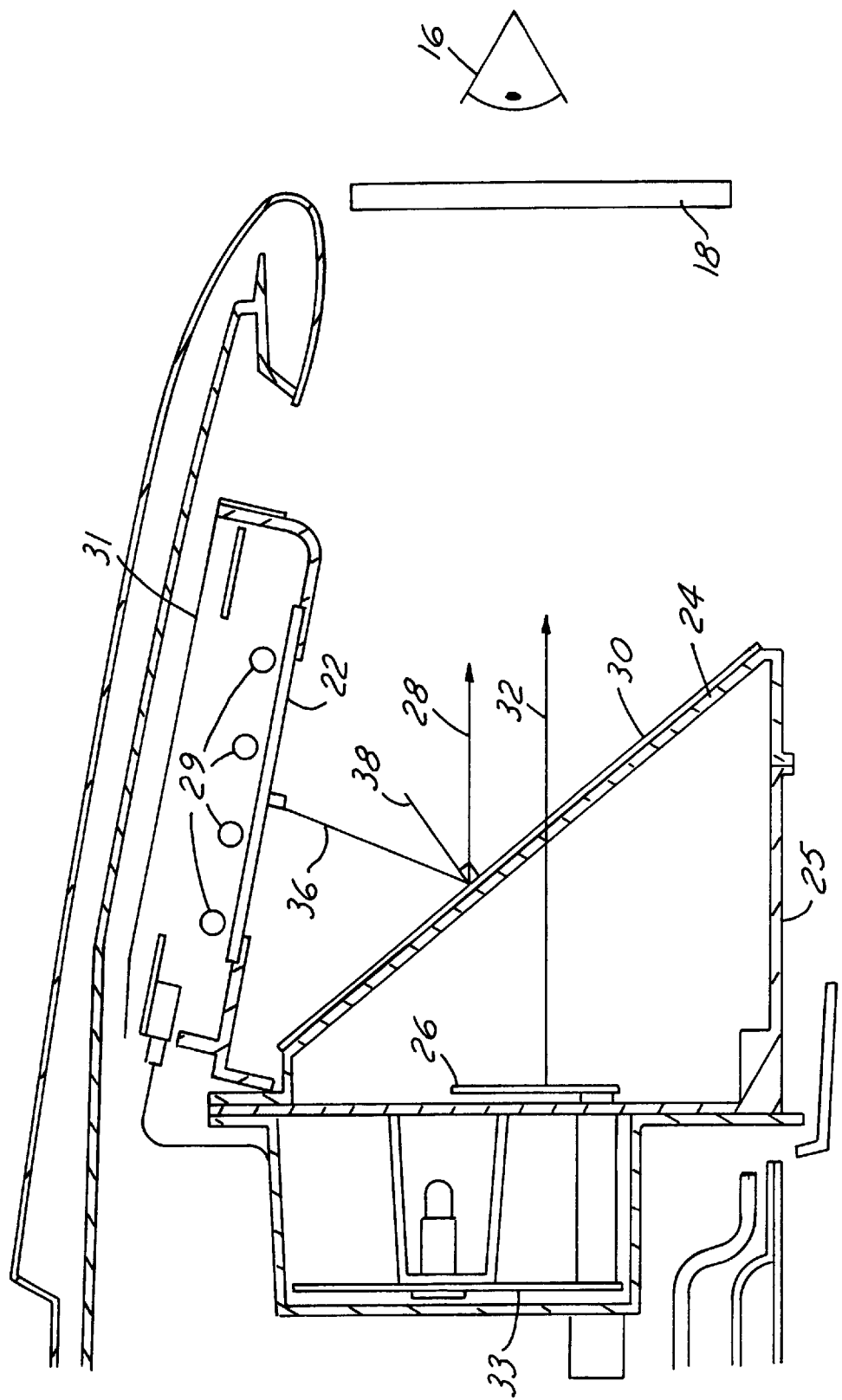
FIG. 3 is a cross-sectional diagrammatic view of the instrument display and light rays forming an image.

Referring now to FIG. 3, lighted pointer 26 is shown in relation to transflector 24 and a housing 25. Pointer 26 is preferably mounted to a circuit board 33. The interior of housing is preferably a light absorbing color such as black to prevent light from reflecting from it.

A display panel 22 has a transparent reverse image pattern (corresponding to the numbers shown in FIGS. 2a and 2b) on a generally opaque surface. A light source 29 transmits light through the transparent areas of light source 29. Light source is preferable a cold cathode tube. Various suitable lighting elements, however, would be evident to those skilled in the art. A reflector 31 is used to improve the uniformity of light distribution across display panel 22. Transflector 24 reverses the reverse image from display panel 22 upon reflection to form a righted image.

Transflector 24 is preferably made of a material such as acrylic (polymethylmethacralate) that both has light reflecting and transmitting properties. It is also preferred that the acrylic be colored a color such as gray to mask the components behind transflector 24 while allowing light rays 32 from pointer 26 to be transmitted through transflector 24.

An angle 34 between normal 36 to display panel 22 and normal 38 to transflector 24 is preferably at or near the Brewster's angle at the air-to-transflector interface. The Brewster's angle $\theta_p$ is given by the formula:

$$\tan\theta_p = \frac{n_2}{n_1}$$

where $\theta_p$ is the angle from the normal of the interface, n1 is the index of refraction of the air and n2 is the index of refraction of transflector 24.

Reflected light rays 28 from transflector 24 are polarized. The reflected rays reflect both P-plane and S-plane polarization. The incident energy reflected is about 5 percent polarized near the Brewster angle for the materials described; 4.6 percent S-plane polarization and 0.4 percent P-plane polarization. If sunglasses 18 contain polarizing lenses, all the S-plane polarization will be extinguished. The resulting intensity of the reflected light will be decreased by a factor of about 11.5.

Transflector 24 preferably has a coating 30 to increase the reflectivity of P-plane polarization to compensate for any loss due to S-plane filtering of sunglasses 18. Coating 30 may be either a metallic coating or a dielectric coating. An adhesion subcoating may be used to increase the adhesion of coating 30 to transflector. Suitable dielectric coatings include titanium nitride and titanium oxide or combinations of both. Suitable metallic coatings include silver, aluminum and aluminum with an aluminum oxide passivation layer (enhanced aluminum).

The extinction ratio coefficient of a material is defined as the ratio of the reflectivity of the P-plane polarization to the reflectivity of the S-plane polarization. A coefficient of greater than 0.3 is considered acceptable for reasonable graphics visibility.

Figure 4:
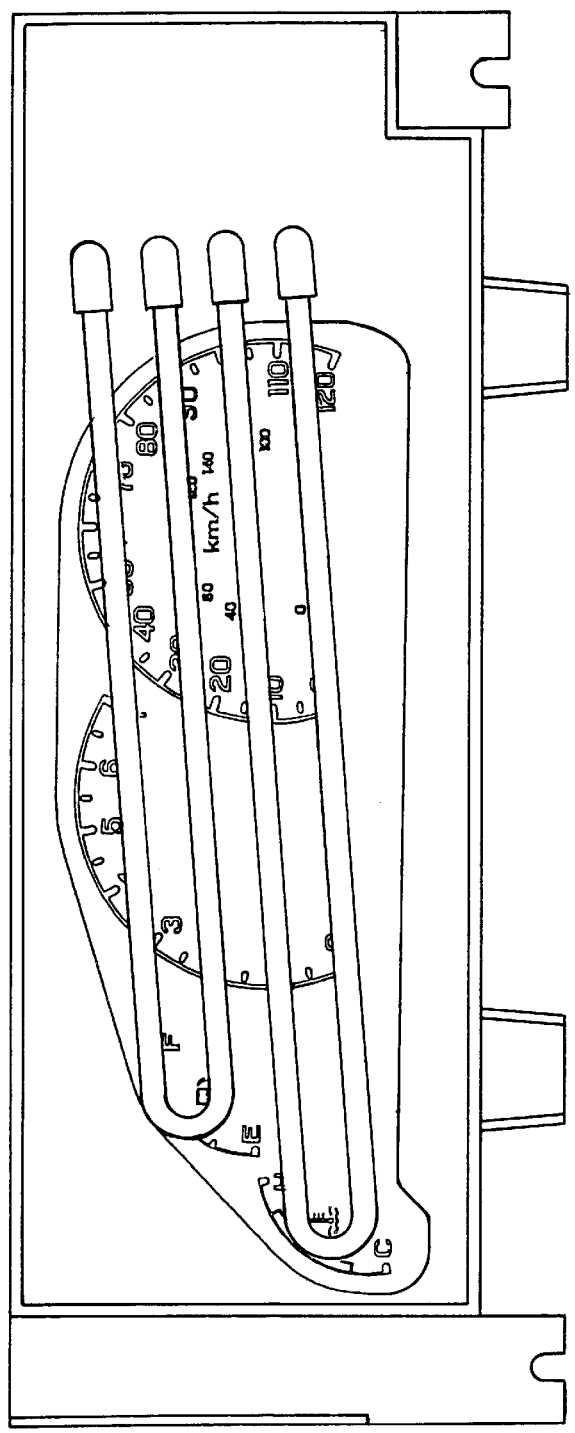
FIG. 4 is a cross-sectional view of the display portion of the instrument display.

Referring now to FIG. 4, a cross-sectional view looking down at display panel 22 and light sources 29 is shown. The numbers shown are transparent areas that may be colored for variety. Light sources 29 are preferably cold cathode tubes having a U-shape. Light sources 29 are spaced to provide even light distribution over the display panel.

Figure 5:
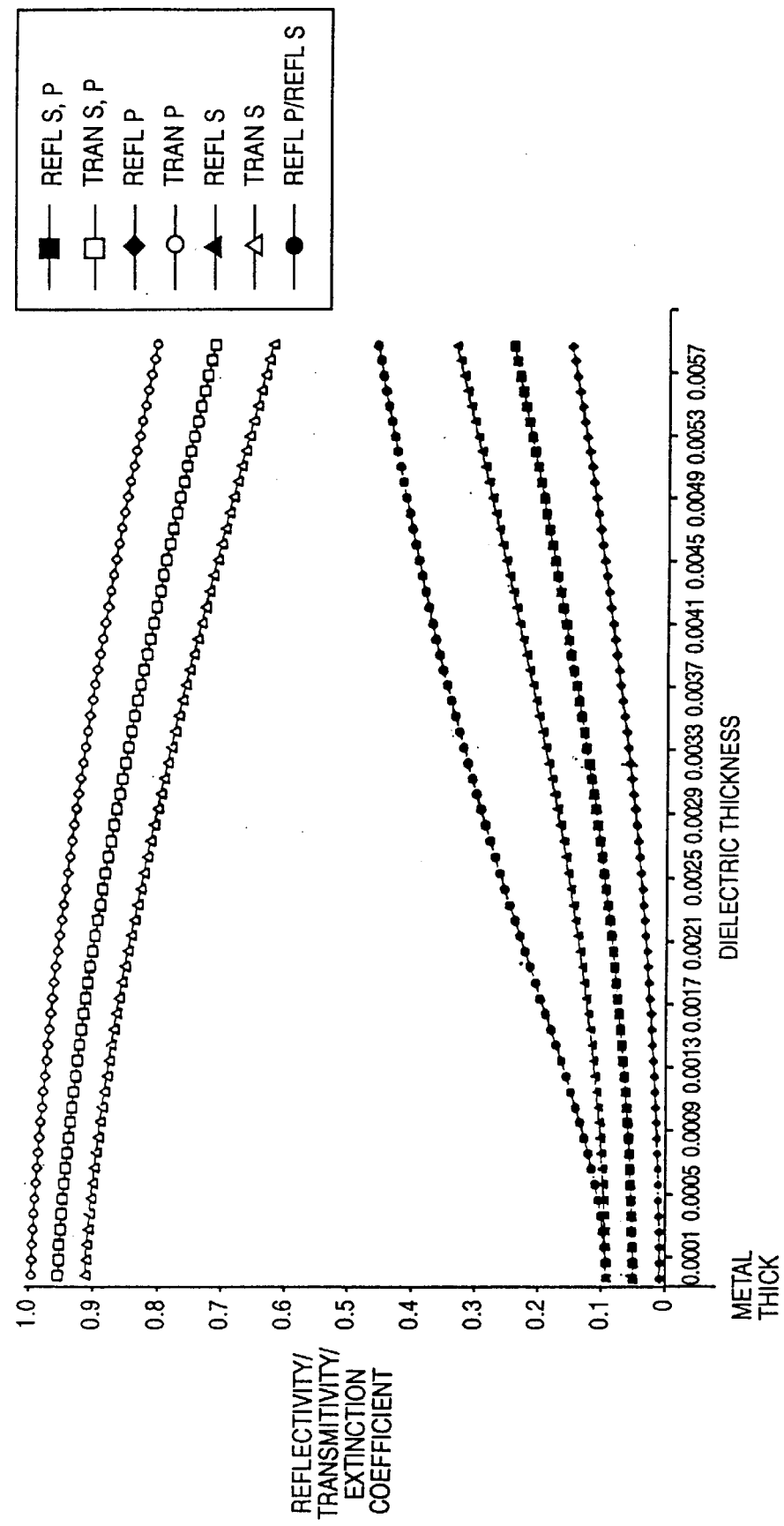
FIG. 5 is a plot of extinction coefficient versus coating thickness of titanium nitride.

Referring now to FIG. 5, the approximate thickness of the film was determined using a multi-layer interference numerical analysis based on material and physical parameters. A dielectric coating thickness is determined by the transflector refractive index, the coating real refractive index, the coating complex refractive index, the real refractive index of the reflective medium (in this case air), the wavelength of the incident illumination, the polarization of the incident illumination, and the angle of the incident illumination. A plot of extinction coefficient versus coating thickness for a dielectric material similar to a titanium nitride or titanium oxide coating is shown. A P-plane reflectivity of 2.9 percent was determined to be adequate to reduce the effects of polarizing sunglass lenses on the display brightness.

Assuming the incident light is at forty-five degrees and the wavelength of the light is 0.5 microns (the center of the visible band), the incident light has equal S-plane and P-plane polarization. The base transflector material is acrylic (polymethymethacralaterefractive index 1.496), the real refractive index of the coating is 0.16, the imaginary refractive index is 3.8 and the reflective medium is air (real refractive index of 1.0). To achieve a P-plane reflectivity of 2.9 percent the coating thickness should be approximately 0.0059 mm.

In practice, the coating thickness and broadband (spectral and angular) properties and desired reflectance/transmittance characteristics may be difficult to achieve. Multi-layer dielectric stacks may be required to achieve the desired broadband performance while maintaining the required reflectance/transmittance characteristics. Multi-layer stack coating development based on practical materials is well understood by those skilled in the art. For example, a four layer stack of titanium nitride/titanium oxide was found to give sufficient results.

Figure 6:
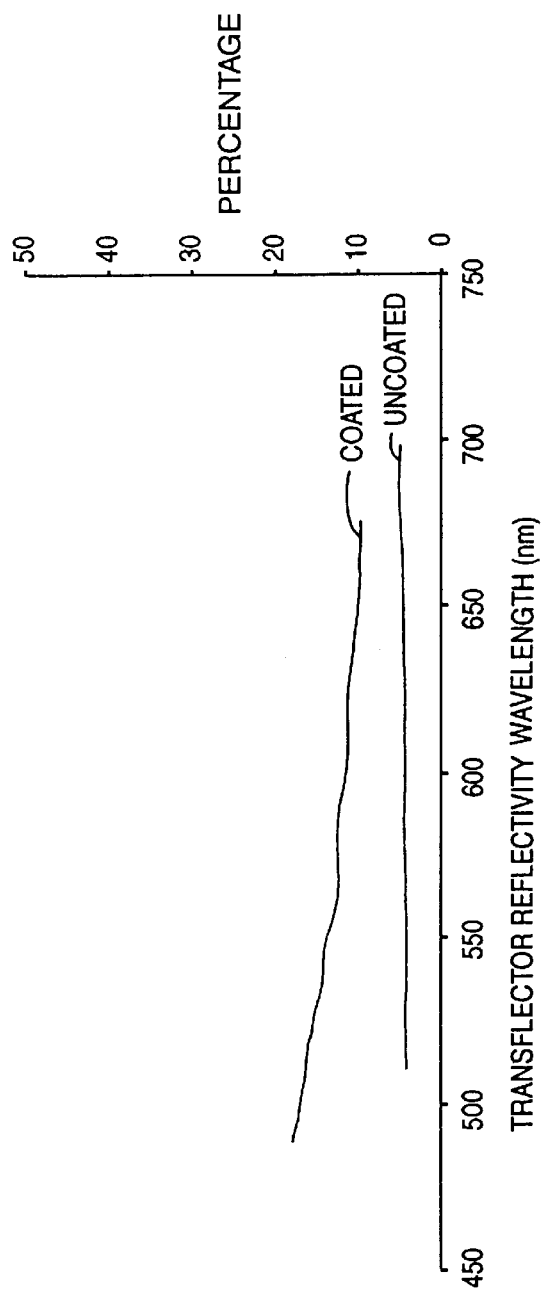
FIG. 6 is a plot of the percent reflectivity of a coated and uncoated transflector versus wavelength of light.

Referring now to FIG. 6, is a plot of the percent reflectivity of a transflector coated with a subcoated four layer stack of titanium nitride/titanium oxide material and an uncoated acrylic transflector illuminated at forty-five degrees as a function of wavelength. The extinction coefficient of reflected P-plane polarization/reflected S-plane polarization was found to be of the dielectric stack was measured and found to be about 0.33 at the center of the visible band.

Figure 7:
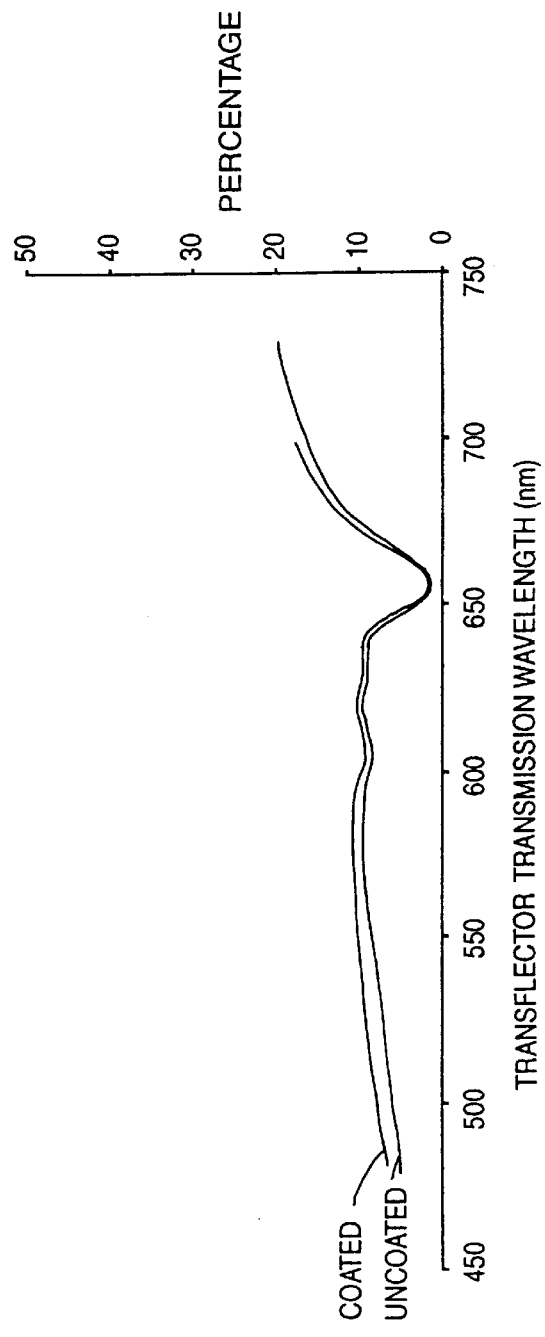
FIG. 7 is a plot of percent transmission of light of a coated and uncoated transflector versus wavelength of light.

Referring now to FIG. 7, is a plot of the percent transmission of light of a transflector coated with titanium nitride and uncoated transflector illuminated at forty five degrees as a function of wavelength. As is preferable to the operation of the present invention, the coating has an insignificant effect on the transmission of light.

As would be evident to one skilled in the art, several modifications of the invention may be made while still being within the scope of the appended claims. For example, the materials used for illumination and the angles of illuminated light may be varied.

We claim:

1. An instrument display for an automotive vehicle comprising:

a planar reverse image light emitting display panel;

a transflector surface positioned at a predetermined angle with respect to the display panel, the transflector surface having a P-plane reflectance and a S-plane reflectance;

a coating disposed on the transflector surface adapted to increase the P-plane reflectance of the transflector surface; and an internally illuminated light emitting diode instrument pointer positioned behind the transflector surface adapted to transmit light through the transflector surface;

wherein the transflector surface and the coating transmit light simultaneously with the instrument pointer in a predetermined direction to form a single image.

\* \* \* \* \*